(12) United States Patent
Hahlbeck

(10) Patent No.: US 7,719,129 B2
(45) Date of Patent: May 18, 2010

(54) ELECTRIC GENERATOR FOR WIND AND WATER TURBINES

(75) Inventor: Edwin C. Hahlbeck, Pewaukee, WI (US)

(73) Assignee: Clipper Windpower, Inc., Carpenteria, CA (US)

( * ) Notice: Subject to any disclaimer, the term of this patent is extended or adjusted under 35 U.S.C. 154(b) by 205 days.

(21) Appl. No.: 12/096,087

(22) PCT Filed: Mar. 23, 2007

(86) PCT No.: PCT/IB2007/000746

§ 371 (c)(1),
(2), (4) Date: Jun. 4, 2008

(87) PCT Pub. No.: WO2007/116263

PCT Pub. Date: Oct. 18, 2007

(65) Prior Publication Data

US 2008/0309091 A1    Dec. 18, 2008

(51) Int. Cl.
*F03D 9/00*    (2006.01)
(52) U.S. Cl. ........................................ 290/55
(58) Field of Classification Search ............... 290/55
See application file for complete search history.

(56) References Cited

U.S. PATENT DOCUMENTS 6,921,243 B2 * 7/2005 Canini et al. ............... 415/4.3
7,498,683 B2 * 3/2009 Landwehr .................... 290/43
2009/0015020 A1 * 1/2009 Stiesdal ........................ 290/55
2009/0026771 A1 * 1/2009 Bevington et al. ............ 290/55

FOREIGN PATENT DOCUMENTS

| DE | 4437972 A1 | * | 4/1996 |
| EP | 1243791 A2 | * | 9/2002 |
| JP | 2001342942 A | * | 12/2001 |
| JP | 2002221263 A | * | 8/2002 |
| WO | WO 2004027260 A1 | * | 4/2004 |
| WO | WO 2005050059 A1 | * | 6/2005 |

\* cited by examiner

*Primary Examiner*—Joseph Waks
(74) *Attorney, Agent, or Firm*—Fay Sharpe LLP

(57) ABSTRACT

A generator housed in a wind turbine nacelle includes a generator rotor that is mounted to gearbox output pinions, thereby eliminating the need for couplings. The generator frame is located directly on the gearbox and is located to control the air gap. To facilitate removal of the generator, tapers are used that have steep angles that exceed the friction coefficient of the materials used. To provide adequate support over its length, the shaft employs dual tapers, each short and precisely located conical surface of which provides exact location on the near and far sides of the shaft. The length of straight shaft between the dual locating tapers serves to support the generator during mounting and de-mounting. During installation, the tapers center the rotor and bullet pins center the frame (stator). When the system aligns the rotor and stator, retainer elements act as labyrinth seals designed to protect the generator interior from contamination.

4 Claims, 7 Drawing Sheets

ELECTRIC GENERATOR FOR WIND AND WATER TURBINES

CROSS-REFERENCE TO RELATED APPLICATIONS

This application is related to U.S. patent application Ser. No. 10/773,851 Variable Speed Wind Turbine Technology, which was filed on Feb. 4, 2004; U.S. Pat. No. 6,304,002; U.S. patent application Ser. No. 10/213,764 of Amir S. Mikhail and Edwin C. Hahlbeck entitled "Improved Distributed Power Train That Increases Electric Power Generator Density" filed Aug. 7, 2002; U.S. patent application Ser. No. 09/920,247 of Peter Stricker, entitled "Distributed Generation Drivetrain (DGD) Controller For Application To Wind Turbine and Ocean Current Turbine Generators" filed Jul. 31, 2001; U.S. patent application Ser. No. 10/426,287 Kevin L. Cousineau: Distributed Static VAR Compensation (DSVC) System For Wind And Water Turbine Applications" filed Apr. 30, 2003, and U.S. patent application Ser. No. 10/449,342 of Amir S. Mikhail and Edwin C. Hahlbeck entitled "Improved Distributed Power Train (DGD) with Multiple Power Paths" filed May 31, 2003, all of which are assigned to Clipper Windpower Technology, Inc. and are incorporated herein by reference.

BACKGROUND OF THE INVENTION

1. Field of the Invention

This invention relates to electric power-generating devices, such as wind turbines and ocean current turbines, and more particularly to an electric generator particularly suited to being housed in a turbine nacelle of a horizontal axis, axial flow, wind or water turbine.

2. Prior Art

In a typical horizontal-axis wind turbine, a nacelle is mounted on a tall vertical tower. The nacelle houses power-transmitting mechanisms, electrical equipment and supports a rotor system at one end. Rotor systems for horizontal-axis wind turbines ordinarily include one or more blades attached to a rotor hub on a shaft. Wind flow turns the rotor, which turns a main shaft in the nacelle. The shaft turns gearbox gears that transmit torque to an electric generator. The nacelle typically pivots about the vertical tower to take advantage of wind flowing from any direction. The pivoting about this vertical-axis in response to changes in wind direction is known as yaw or yaw response and the vertical-axis is referred to as the yaw-axis. As wind moves past the blades with enough speed the rotor system rotates and the wind turbine converts the wind energy into electrical energy through the generator. An electrical output of the generator is connected to a power grid.

Generators used in wind turbines are customarily connected to the gearbox output shaft with a flexible coupling. The generator is mounted on a support structure and is shimmed or adjusted by screws to align the generator to the gearbox.

Due to the flexibility of very large platforms, the coupling is expanded to a coupling and jackshaft to accommodate deflection. The generator rotor is supported by bearings located in the generator frame and requires lubrication on a regular schedule.

It is therefore desirable to provide a generator mounting system that eliminates couplings.

It is also desirable to provide a wind turbine generator that is easy to mount and de-mount in a nacelle that is located atop a tall tower.

It is also desirable to provide a wind turbine generator that provides perfect or near perfect alignment of air gap.

It is also desirable to provide a wind turbine generator that provides cost savings by using a labyrinth seal that doubles as a magnet protector.

SUMMARY OF THE INVENTION

In accordance with the principles of this invention a generator for horizontal-axis fluid-flow turbines includes a generator rotor uniquely mounted to gearbox output pinions, thereby eliminating the need for couplings. The generator frame is located directly on the gearbox and is located to control the air gap.

The control of the air gap is critical to proper generator function. In accordance with an aspect of the invention, the location of the generator rotor is served by dual locating tapers. The tapers permit clearance-free alignment. To facilitate removal of the generator, the tapers have steep angles that exceed the friction coefficient of the materials used. Steep tapers have limited length as the diameter diminishes quickly. To provide adequate support over its length, the shaft employs dual tapers; each short and precisely located conical surface provides exact location on the near and far sides of the shaft. Finding the exact location ensures correct balance of the rotor.

The length of straight shaft between the dual locating tapers serves to support the generator during mounting and de-mounting. This is important because it makes mounting of the generator convenient and safe. The fit on the shaft and mating rotor bore has sufficient clearance to allow assembly under all conditions.

The straight shaft portion between the dual locating tapers, while having sufficient clearance for assembly ease, locates the generator frame sufficiently accurately to allow starting engagement of frame location pins. These bullet-shaped pins cause self-aligning of the frame as the generator is advanced on the gearbox shaft during mounting of the generator in the nacelle.

As the generator assembly is pulled onto the shaft by the tightening of its mounting bolts, the tapers center the rotor and the bullet pins center the frame (stator).

The rotor and stator are each retained by their respective bolting system. The rotor bolting system provides sufficient contact load on the tapers to transmit the necessary drive torque.

In order to roughly align the rotor and frame subassembly, the subassembly is aligned by loose fitting retainer elements. These elements have slightly less clearance than the air gap so as to center the rotor and stator well enough to prevent damage to the rotor magnets. When the system aligns the rotor and stator, these retainer elements act as labyrinth seals designed to protect the generator interior from contamination.

The invention has the advantage that the unique mounting system eliminates couplings.

The invention has the advantage that the generator is easy to mount and de-mount in a wind turbine nacelle located atop a tall tower.

The invention has the advantage that the generator design provides a near perfect or perfect alignment of air gap. Perfect alignment causes balance to repeat to factory tolerance.

The invention has the advantage that the labyrinth seal of the generator doubles as a magnet protector, thereby resulting in cost savings.

The invention has the advantage that the use of tapers allows the orientation of the rotor-to-gearbox to be random.

Field gearboxes have a brake applied. A generator without bearings cannot be easily aligned if keys are used.

DETAILED DESCRIPTION OF THE INVENTION

Figure 1:
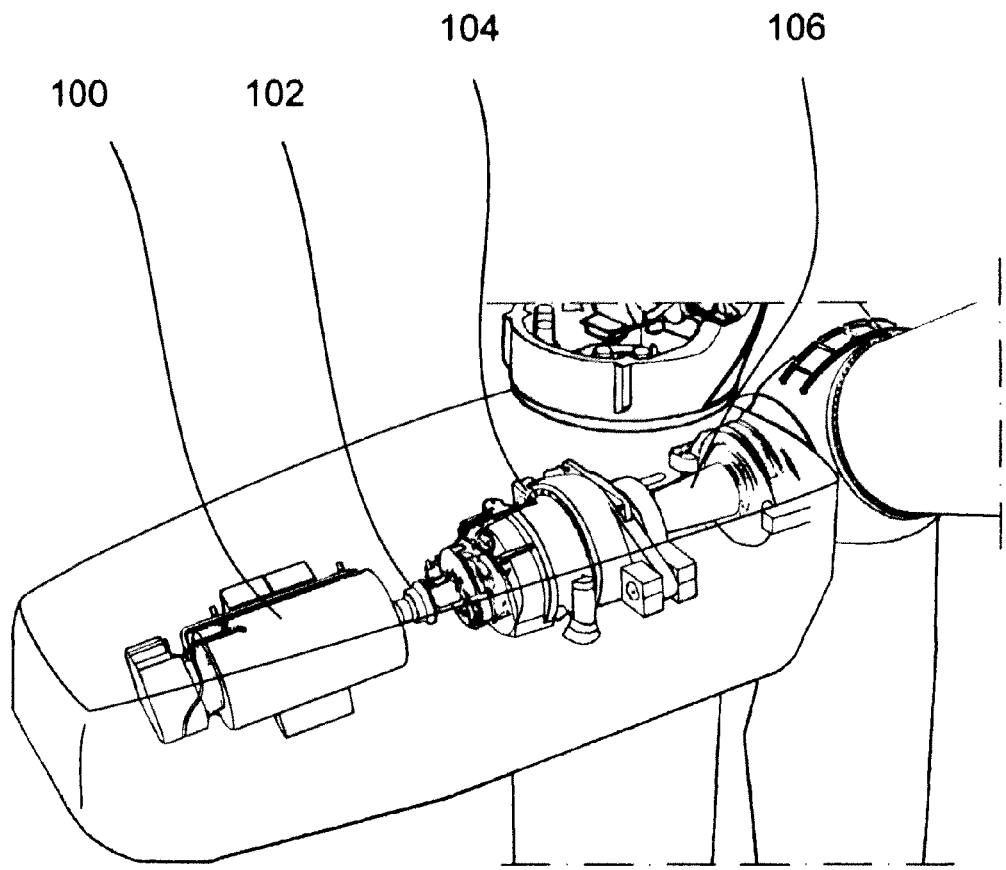
FIG. 1 is a cut-away perspective view of a conventional wind turbine generator of the prior art.

Refer to FIG. 1, which is a cut-away perspective view of a conventional wind turbine generator of the prior art. The wind turbine is comprised of a generator 100 and a gearbox 104, which are coupled to the generator input shaft via a coupling 102. The gearbox input shaft is connected to a turbine main shaft 106, which is driven by the turbine rotor, which is turned by wind power.

The principal features of the present invention that distinguish it over the prior art are summarized below and the key components are discussed in more detail in the sections that follow.

Figure 2A:
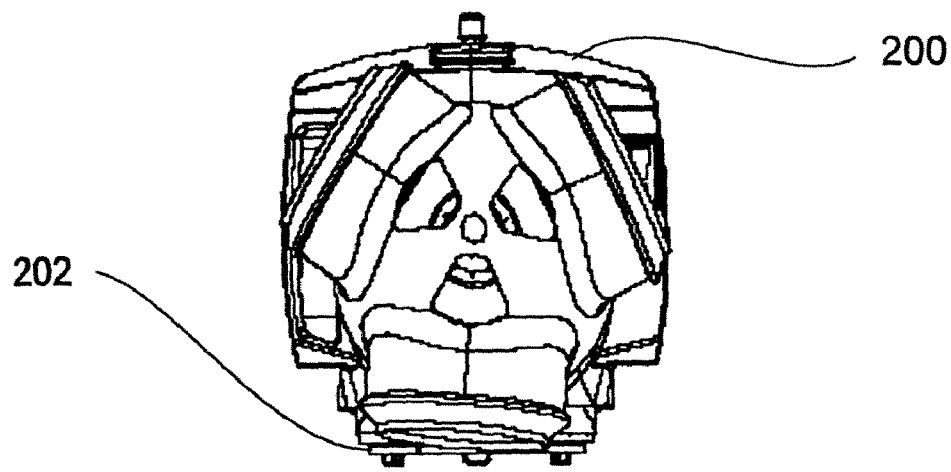
FIG. 2A is a front view of a nacelle in which the invention is embodied.
Figure 2B:
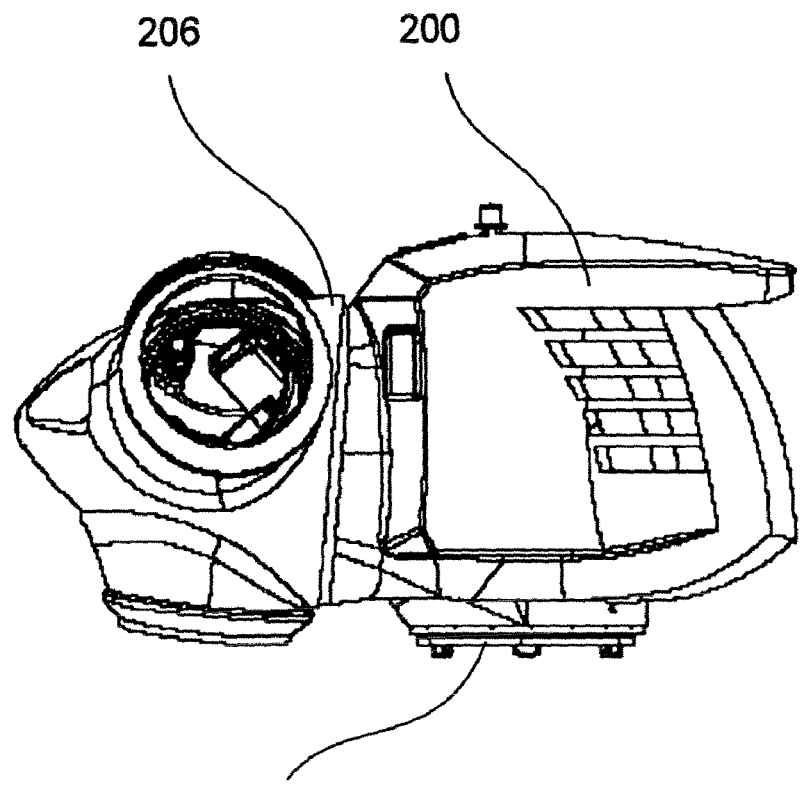
FIG. 2B is a port side view of a nacelle in which the invention is embodied.

- Compact drive train featuring an integrated main shaft, two stage helical gearbox, and multi-generator arrangement that are driven by four output shafts. See FIG. 2C.
- Compact nacelle that is significantly shorter than some comparably rated wind turbines. FIGS. 2A and 2B show key dimensions of an assembled nacelle;
- Four separate liquid-cooled or air-cooled permanent magnet synchronous generators with full power conversion;
- Reduced crane capacity requirement, comparable to that required for a typical 1.5 MW to 2 MW rated turbine.

Figure 2C:
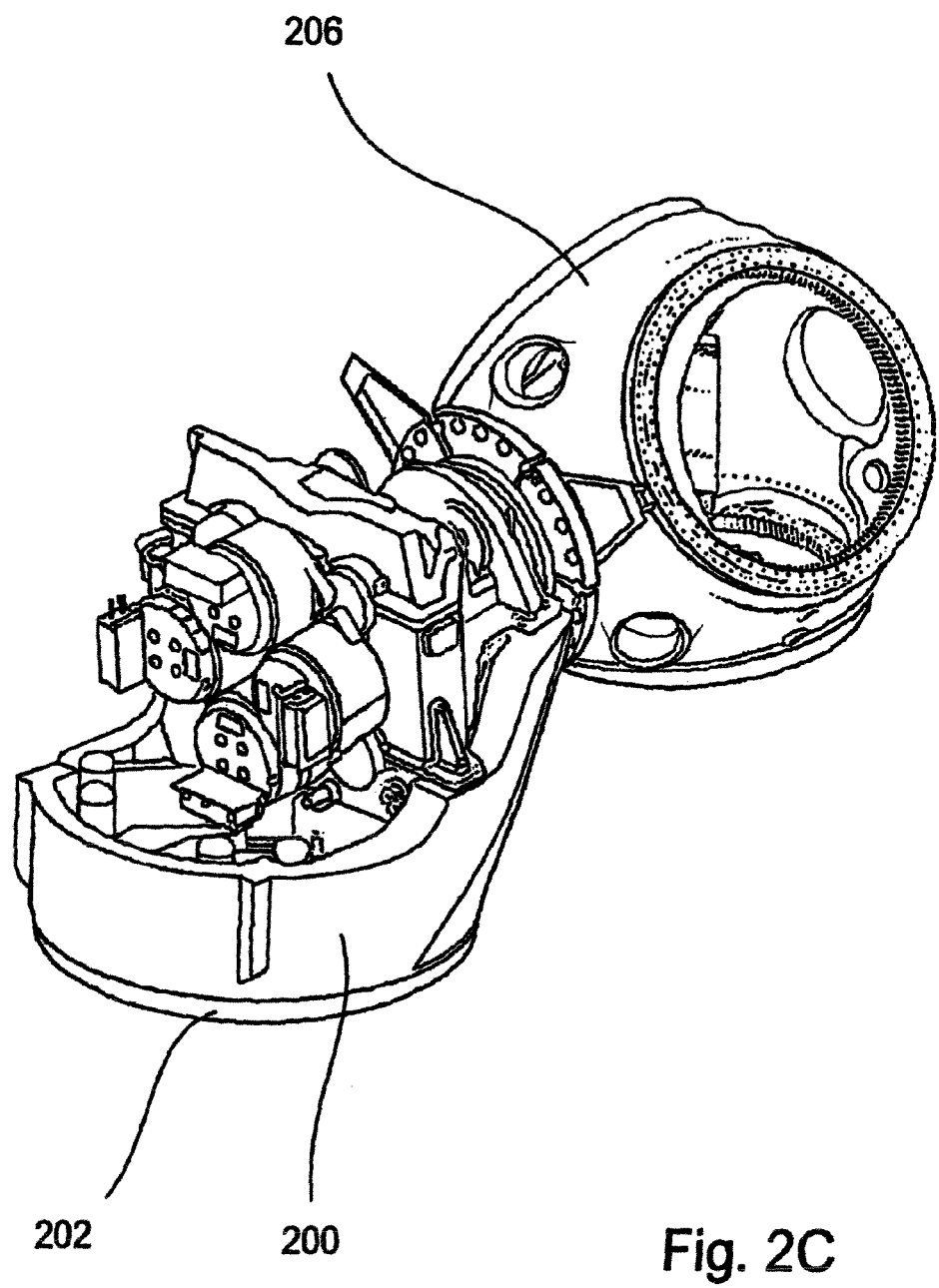
FIG. 2C is a cut-away perspective view of nacelle of FIGS. 2A and 2B.
Figure 2D:
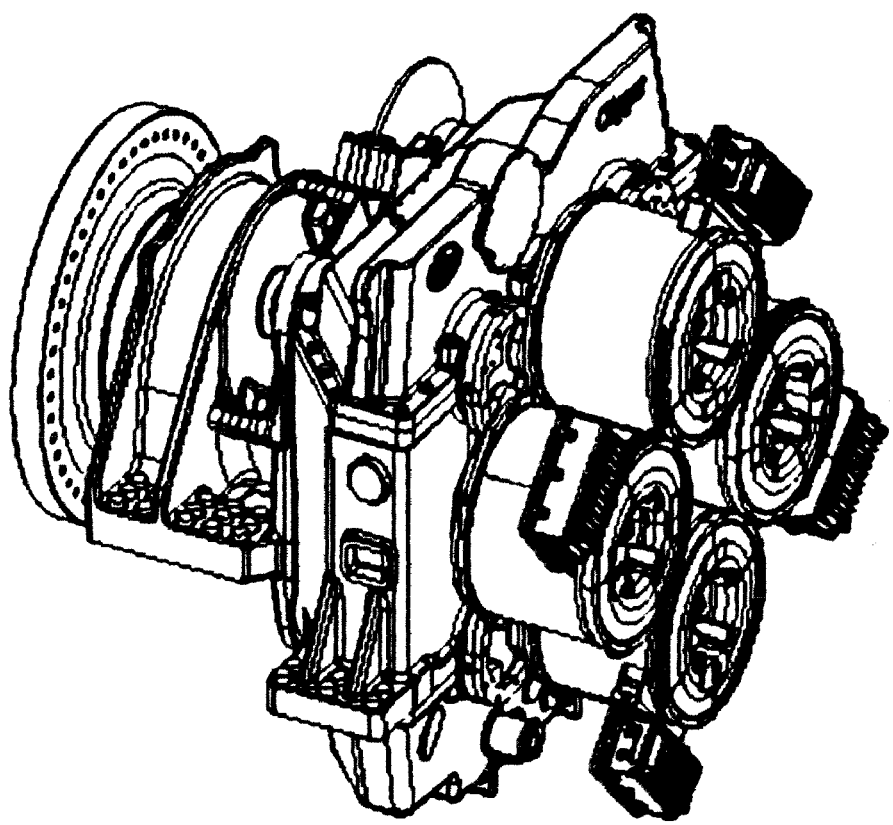
FIG. 2D is a perspective view of a subassembly comprised of four generators in each of which the present invention is embodied.

Refer to FIGS. 2C and 2D, which are perspective views of a wind turbine generator subassembly comprising four generators. The present invention is embodied in each generator. The wind power-generating device includes an electric generator housed in a turbine nacelle 200, which is mounted to a yaw base 202 atop a tall tower structure anchored to the ground. The turbine yaw base 202 is free to rotate in the horizontal plane such that it tends to remain in the path of prevailing wind current. The turbine has a hub 206 with main blades (not shown) attached thereto. The blades rotate in response to wind current. Each of the blades may have a blade extension section that is variable in length to provide a variable diameter rotor and may be geared to change pitch.

The nacelle 200 houses power-transmitting mechanisms, electrical equipment and a shaft that supports the rotor. The rotor system shown in FIGS. 2C and 2D has blades (not shown) attached to the outer rim of the hub 206, which turns a shaft in the nacelle. The shaft turns gears that transmit torque to the four electric generators. The nacelle pivots about a vertical axis to take advantage of wind flowing from any direction. The pivoting about this vertical-axis in response to changes in wind direction is known as yaw or yaw response and the vertical-axis is referred to as the yaw-axis. As wind moves past the blades with enough speed the rotor system rotates and the wind turbine converts the wind energy into electrical energy through the generators. Electrical outputs of the generators are connected to a power grid.

The rotor diameter may be controlled to fully extend the rotor blades at low flow velocity and to retract the rotor blades as flow velocity increases such that the loads delivered by or exerted upon the rotor do not exceed set limits. The turbine is held by the tower structure in the path of the wind current such that the turbine is held in place horizontally in alignment with the wind current. The electric generator is driven by the turbine to produce electricity and is connected to power carrying cables inter-connecting to other units and/or to a power grid.

Figure 3:
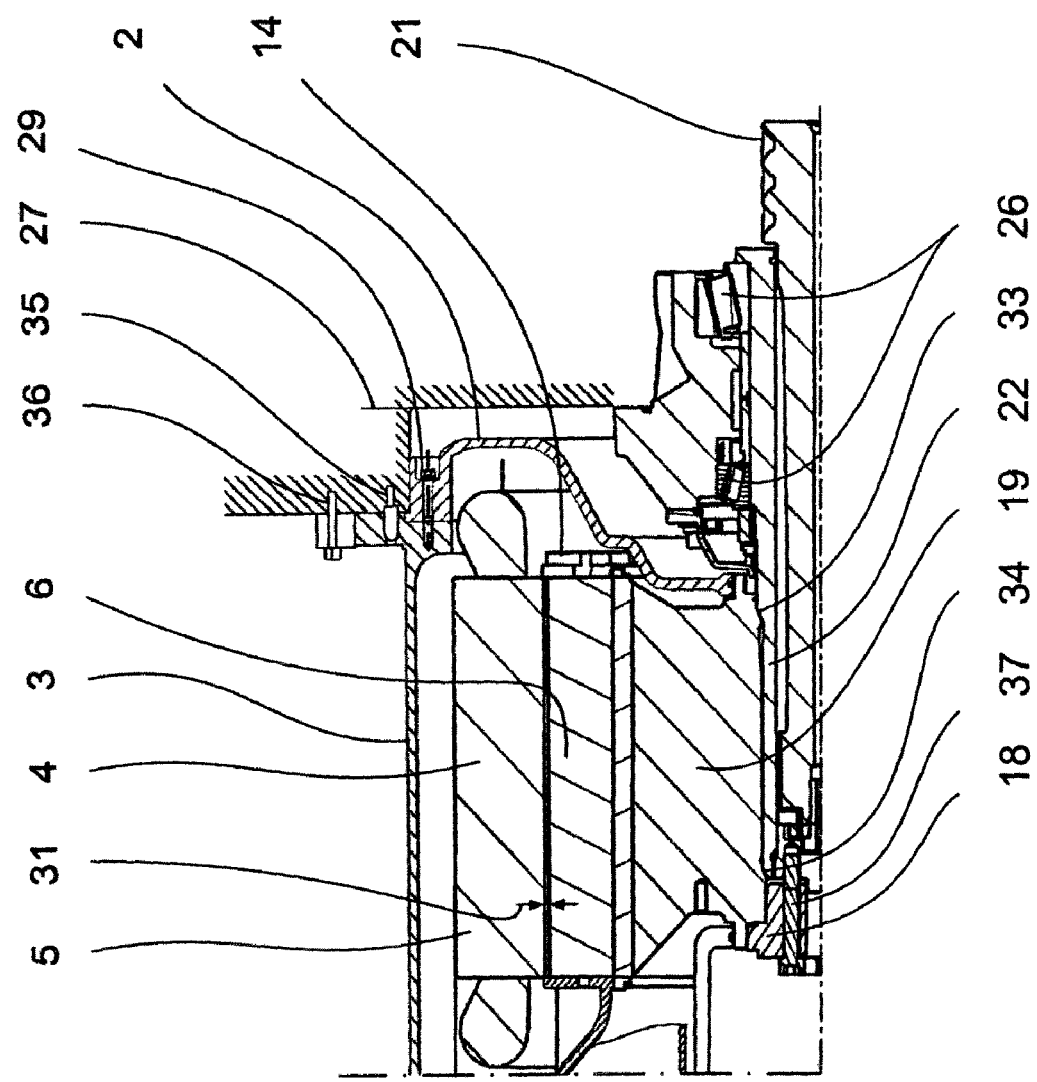
FIG. 3 is a cross-sectional side view of one of the generators shown in FIG. 2D.
Figure 4:
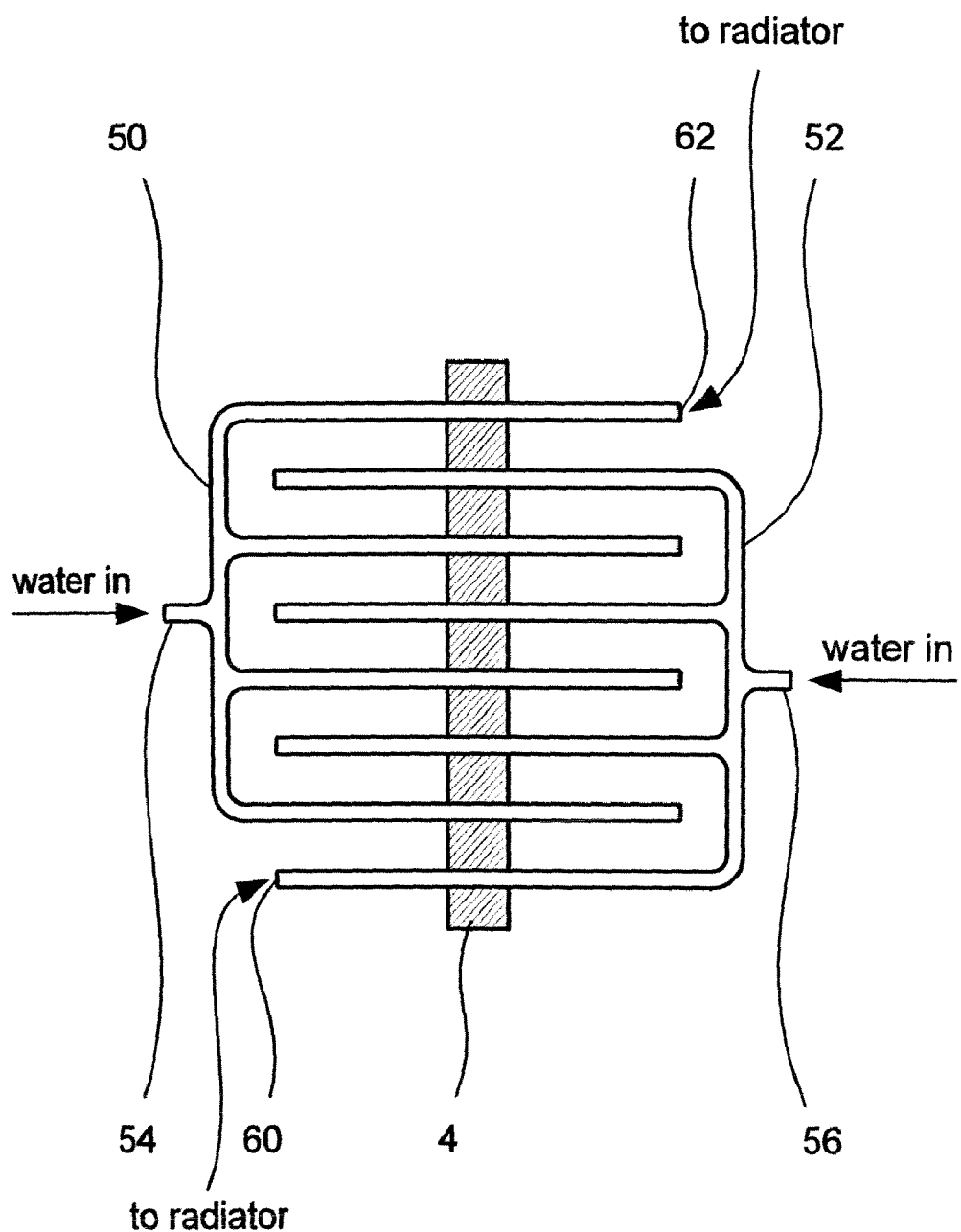
FIG. 4 is an illustration of the water-cooling tubes shown in FIG. 4.

Refer to FIG. 3, which is a cross-sectional side view of one of the generators shown in FIGS. 2C and 2D. The following numerals identify corresponding elements of the generator/gearbox apparatus:

2—upwind-end housing
3—outer jacket
4—stator core
5—end fan
6—rotor core
8—retainer bolt
9—grease hose
10—ground brush
12—brush hub
14—radial fan
16—labyrinth seal
17—outboard bearing optional-
18—spindle hub
19—rotor hub
21—gearbox high-speed pinion
22—gearbox spindle
26—gearbox spindle bearings
27—gearbox housing
29—upwind-end housing bolt
31—air gap
33—taper
34—taper
35—bullet nose pin
36—mounting bolts
37—rotor bolts The generator includes a generator rotor 6 uniquely mounted to the gearbox output pinions 21 eliminating the need for couplings. The generator frame 3 is located directly on the gearbox 27 and located to control the air gap 31.

The control of air gap is critical to proper generator function. The location of the generator rotor is aligned by dual tapers 33 and 34. The tapers permit clearance free alignment. To facilitate removal the tapers have steep angles that exceed the friction coefficient of the materials used. Steep tapers have limited length as the diameter diminishes quickly. The shaft employs dual tapers in order to provide adequate support over its length. Each short and precisely located conical surface of the tapers provides exact location on the near and far sides.

The length of straight spindle shaft 22 between the locating tapers 33 and 34 serves to support the generator during mounting and de-mounting. This is important to make mounting convenient and safe. The fit on this shaft and mating rotor bore has sufficient clearance to allow assembly under all conditions.

The straight spindle shaft portion 22, while having sufficient clearance for assembly ease, locates the generator frame 3 sufficiently accurately to allow starting engagement of frame location pins 35. These bullet shaped pins 35 cause self-aligning of the frame as the generator is advanced on the gearbox shaft 22.

As the generator assembly is pulled onto the shaft by the tightening of its mounting bolts 36, the tapers center the rotor 6 and the bullet pins 35 center the frame/stator 3.

The rotor and stator are each retained by their respective bolting system. The rotor bolting system 36 provides sufficient contact load on the tapers 33, 34 to transmit the necessary drive torque.

In order to roughly align the rotor and frame subassembly, they are aligned by loose fitting retainer elements 2-16. These elements 2-16 have slightly less clearance than the air gap 31 so as to center the rotor and stator well enough to prevent damage to the rotor magnets 38. When the system aligns the rotor and stator, these retainer elements act as labyrinth seals 16 designed to protect the generator interior from contamination.

Figures 5A, 5B:
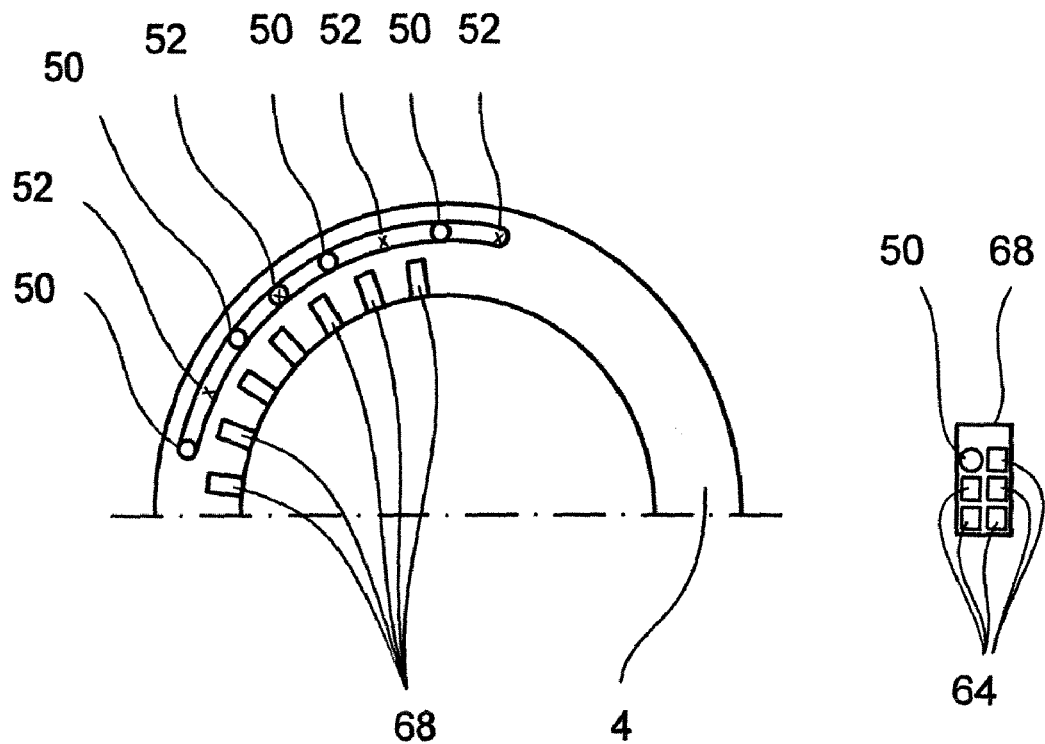
FIG. 5A is a cross-sectional view of one half of the stator.
FIG. 5B is a cross-sectional view of a winding slot.

FIG. 5A is a cross-sectional view of one half of the stator showing the cooling tubes, 50 and 52, in holes adjacent the windings 64 or the winding slots 68.

FIG. 5B is a cross-sectional view of a winding slot 68 showing a cooling tube 50 within the winding slot (as an alternative to the arrangement shown in FIG. 6A).

Figure 6:
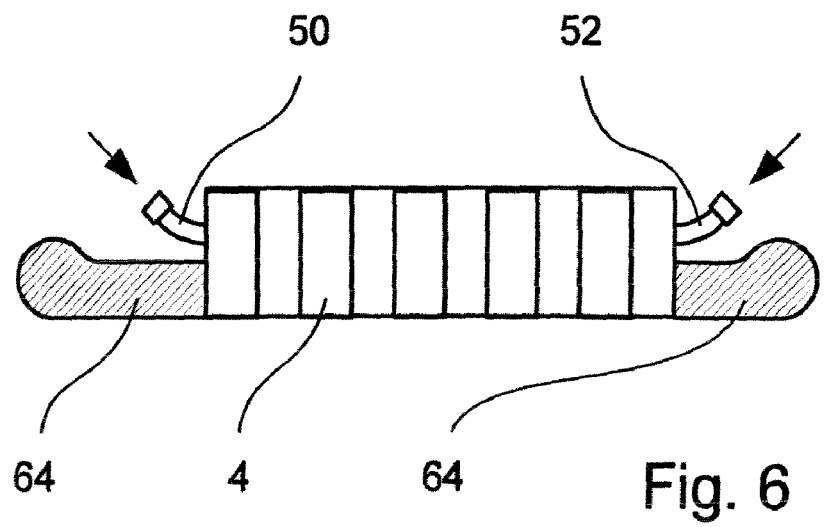
FIG. 6 is a view of the stator core shown in FIG. 3

FIG. 6 is a view of the stator core 4 shown in FIG. 3.

SUMMARY

What has been described is a very compact windpower generator design, which reduces weight and permits practical lowering and hoisting the generator by means of an on-board crane located in the windpower turbine nacelle in which the generator is housed. A generator constructed in accordance with the principles of the invention should achieve the minimum weight possible because the generator is shaft-less, end covers do not support the rotor so they are light weight, making self-handling possible. Those skilled in the art will realize that one of the end covers can be eliminated altogether by using the gearbox face to close that end of the generator.

In a conventional machine, the gearbox shaft has a key, as does the generator shaft. If the generator is bearing less, one can't turn the rotor well until after it is mounted. Meanwhile, as the turbine is put in place in the wind turbine, the shaft must be fixed for safety. This precludes one from orienting the two keys without special handling means. The taper-fits eliminate this problem, because there are no keys to align.

The lowering of cost, reduction of part count and putting the bearings inside the gearbox for better lubrication all work together to create a novel windpower turbine.

The invention has been shown and described with reference to a wind turbine mounted atop a land-based tower, those skilled in the art will realize that the invention is also applicable to underwater turbines wherein the turbine is tethered underwater and the blades are turned by the force of water current.

While the invention has been particularly shown and described with reference to preferred embodiments thereof, it will be understood by those skilled in the art that the foregoing and other changes in form and detail may be made therein without departing from the scope of the invention.

The invention claimed is:

1. A generator for housing in a wind turbine nacelle comprising:
   a generator frame positioned on a gearbox and comprising a stator of said generator;
   a rotor of said generator centered on an output shaft of said gearbox; and
   means for guiding the positioning of said frame to control an air gap between said stator and said rotor, wherein the output shaft employs dual tapers, each short and precisely located conical surface of which provides exact location on the near and far sides of the output shaft to provide adequate support over the shaft length, such that the length of straight output shaft between the dual locating tapers serves to support the generator during mounting and de-mounting.

2. The generator of claim 1, wherein during installation, said locating tapers act to center the rotor and bullet pins act to center said stator.

3. The generator of claim 1, wherein upon alignment of said rotor and said stator, retainer elements act as labyrinth seals that protect the generator interior from contamination.

4. The generator of claim 1, wherein upon alignment of said rotor and said stator, retainer elements act as labyrinth seals that protect the generator interior from contamination.

* * * * *